(12) United States Patent
Stavely et al.

(10) Patent No.: US 7,705,883 B2
(45) Date of Patent: Apr. 27, 2010

(54) SYSTEMS AND METHODS OF ANTI-ALIASING WITH IMAGE STABILIZING SUBSYSTEMS FOR CAMERAS

(75) Inventors: Donald J. Stavely, Windsor, CO (US); Andrew C. Goris, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 821 days.

(21) Appl. No.: 11/261,086

(22) Filed: Oct. 28, 2005

(65) Prior Publication Data

US 2007/0097220 A1    May 3, 2007

(51) Int. Cl.
*H04N 5/228* (2006.01)
*G06K 9/40* (2006.01)
*G09G 5/00* (2006.01)

(52) U.S. Cl. ............ 348/208.11; 348/208.99; 348/208.4; 382/269; 345/611

(58) Field of Classification Search ............ 348/208.99, 348/208.6, 208.4, 208.2, 208.5, 208.13, 335, 348/208.11, 222.1, 208.8; 345/611, 596; 382/269, 210, 263, 264
See application file for complete search history.

(56) References Cited

U.S. PATENT DOCUMENTS

| | | | | |
|---|---|---|---|---|
| 5,063,450 A * | 11/1991 | Pritchard | ............... | 348/219.1 |
| 5,546,194 A * | 8/1996 | Ross | ............... | 358/445 |
| 5,831,671 A * | 11/1998 | Chigira et al. | ............... | 348/208.8 |
| 5,867,213 A * | 2/1999 | Ouchi | ............... | 348/208.5 |
| 5,973,733 A * | 10/1999 | Gove | ............... | 348/208.13 |
| 5,982,421 A * | 11/1999 | Inou et al. | ............... | 348/208.5 |
| 6,486,910 B1 * | 11/2002 | Kaneda et al. | ............... | 348/208.99 |
| 6,573,930 B2 * | 6/2003 | Kyuma et al. | ............... | 348/208.5 |
| 6,747,691 B1 * | 6/2004 | Satoh et al. | ............... | 348/208.5 |
| 6,781,622 B1 * | 8/2004 | Sato et al. | ............... | 348/208.4 |
| 6,801,250 B1 * | 10/2004 | Miyashita | ............... | 348/220.1 |
| 6,900,831 B2 * | 5/2005 | Nishiwaki | ............... | 348/208.5 |
| 6,930,708 B1 * | 8/2005 | Sato et al. | ............... | 348/208.99 |
| 7,167,596 B2 * | 1/2007 | Yamamoto | ............... | 382/269 |
| 7,321,388 B2 * | 1/2008 | Safai | ............... | 348/222.1 |
| 7,349,583 B2 * | 3/2008 | Kumar et al. | ............... | 382/294 |
| 7,408,559 B2 * | 8/2008 | Keshet | ............... | 345/611 |
| 2005/0030409 A1 | 2/2005 | Matherson et al. | | |
| 2006/0087561 A1 * | 4/2006 | Kojima et al. | ............... | 348/208.5 |
| 2008/0037970 A1 * | 2/2008 | Saito et al. | ............... | 396/55 |
| 2008/0111889 A1 * | 5/2008 | Fujita et al. | ............... | 348/208.5 |
| 2008/0158372 A1 * | 7/2008 | Palum et al. | ............... | 348/208.99 |

* cited by examiner

*Primary Examiner*—Tuan Ho
*Assistant Examiner*—Marly Camargo

(57) ABSTRACT

Systems and method for implementing anti-aliasing with image stabilizing subsystems for cameras are disclosed. In an exemplary embodiment the method may comprise characterizing motion of a camera, characterizing aliasing for an image being photographed by the camera, and moving at least one optical element in the camera during exposure of the image for both stabilizing and anti-aliasing the image.

20 Claims, 5 Drawing Sheets

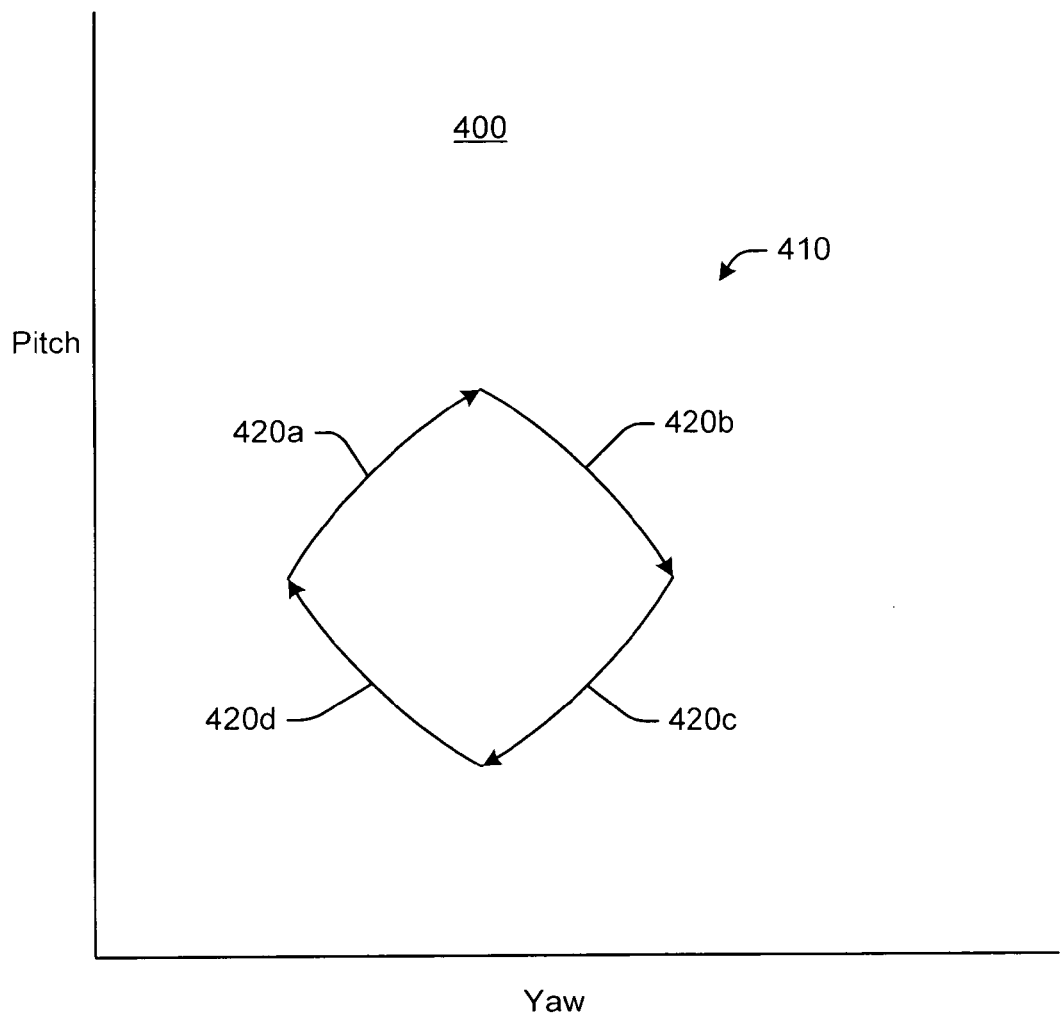

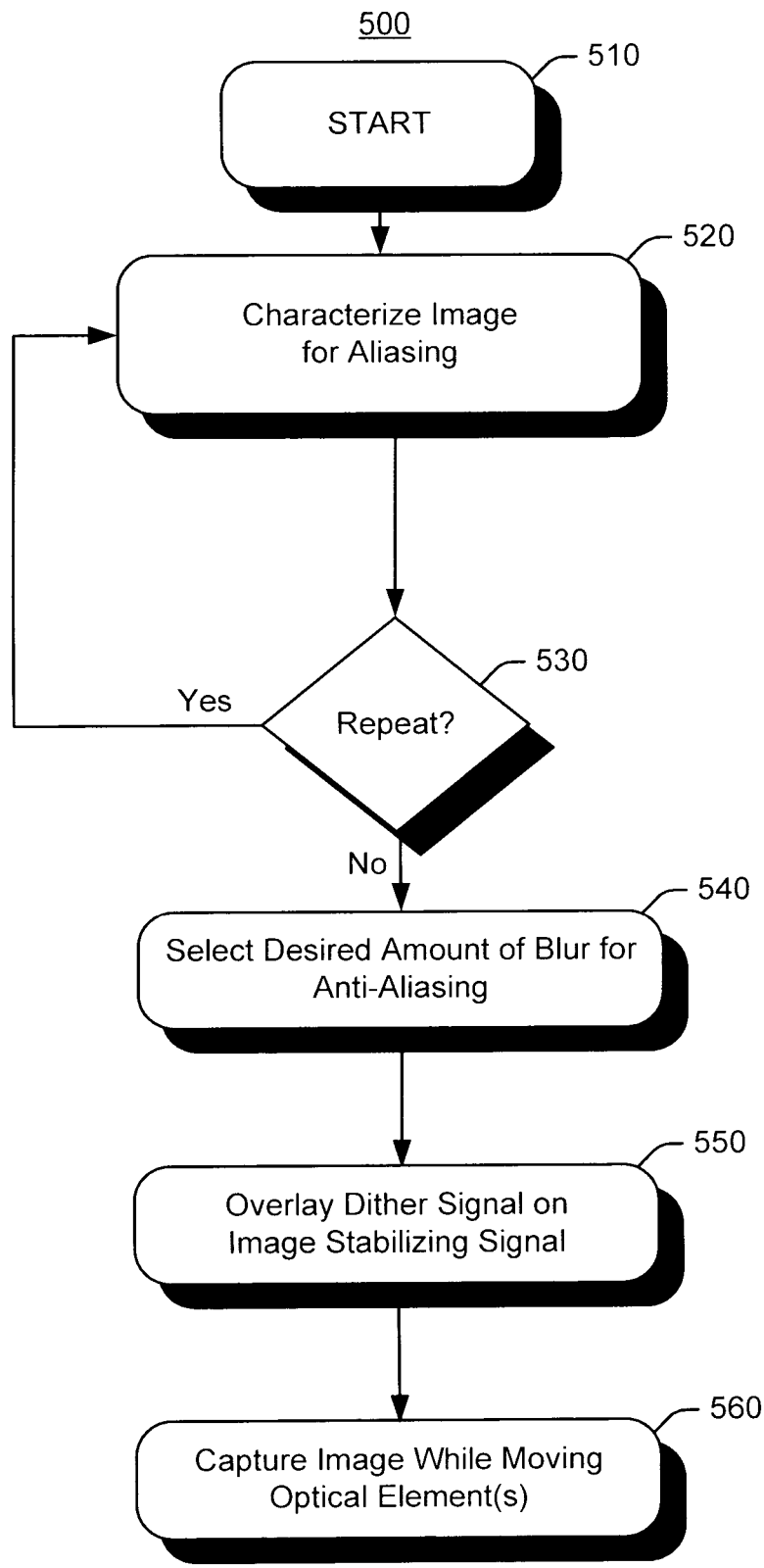

SYSTEMS AND METHODS OF ANTI-ALIASING WITH IMAGE STABILIZING SUBSYSTEMS FOR CAMERAS

TECHNICAL FIELD

The described subject matter relates to cameras in general and more particularly to systems and methods of anti-aliasing with image stabilizing subsystems for cameras.

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease. Unlike conventional film cameras, however, digital cameras include image capture electronics that convert light (or photons) into electrical charge. The electrical charge accumulated on each photo-cell (or pixel) is read out and used to generate a digital image of the scene being photographed.

Generally, the resolution of digital cameras is limited by the number of pixels. If the camera does not have enough pixels to represent smooth lines, individual lines may appear jagged (e.g., as "stair-steps") and/or the image as a whole may appear grainy. In addition, the color of individual pixels in areas of high-contrast and/or fine detail may be erroneously represented as the primary colors registered by the individual pixels and appear as "color artifacts" in the photograph. These undesired effects are known in the digital photography arts as aliasing (and color aliasing).

Aliasing may be reduced by providing more pixels in the camera. For example, the resolution of conventional 35 mm film is estimated to be the equivalent of about 20 million pixels (or mega-pixels). However, most digital cameras in the marketplace today have about 5 mega-pixels. Although cameras having more than 5 mega-pixels are available, these tend to be expensive and bulky.

Cameras are also available with anti-aliasing filters. Anti-aliasing filters shift the light being exposed on the pixels to slightly "blur" the image and thereby reduce aliasing, e.g., by making jagged lines appear smooth or colors blend together. However, the degree of blur cannot be controlled by the use, and therefore may not provide the image sharpness the user desires for certain photographs.

SUMMARY

An exemplary embodiment of anti-aliasing with image stabilizing subsystems for cameras may be implemented as a system. The system may comprise anti-aliasing logic generating a dither signal for anti-aliasing an image, and an image stabilizing subsystem generating an image stabilizing signal for stabilizing the image. At least one actuator drive may be operatively associated with at least one optical element in a camera, the at least one actuator drive moving the at least one optical element during exposure of the image based on the dither signal and the image stabilizing signal.

In another exemplary embodiment, anti-aliasing with image stabilizing subsystems for cameras may be implemented as a method, comprising: characterizing motion of a camera, characterizing aliasing for an image being photographed by the camera, and moving at least one optical element in the camera during exposure of the image for both stabilizing and anti-aliasing the image.

BRIEF DESCRIPTION OF THE DRAWINGS

FIG. 4 is a plot 400 illustrating exemplary actuator response to a dither signal.

FIG. 5 is a flowchart illustrating exemplary operations which may implement anti-aliasing with image stabilizing subsystems for cameras.

DETAILED DESCRIPTION

Briefly, systems and methods of anti-aliasing with image stabilizing subsystems for cameras may be implemented to reduce the effects of aliasing, e.g., the prominence of jagged edges and/or color artifacts in digital images. The systems and methods described herein may be implemented with image stabilizing subsystems which may already be provided in the camera for moving one or more optical elements during exposure to stabilize the image being captured (e.g., against camera motion or shaking).

In an exemplary embodiment, one or more pre-image is used to determine the type and amount of blur to introduce during exposure for anti-aliasing. A control signal is generated by overlaying or otherwise combining a dither signal (for anti-aliasing) with an image stabilizing signal. The image stabilizing subsystem responds to the control signal by moving or shifting one or more optical elements during exposure for both stabilizing and anti-aliasing the image.

Exemplary System

Figure 1:
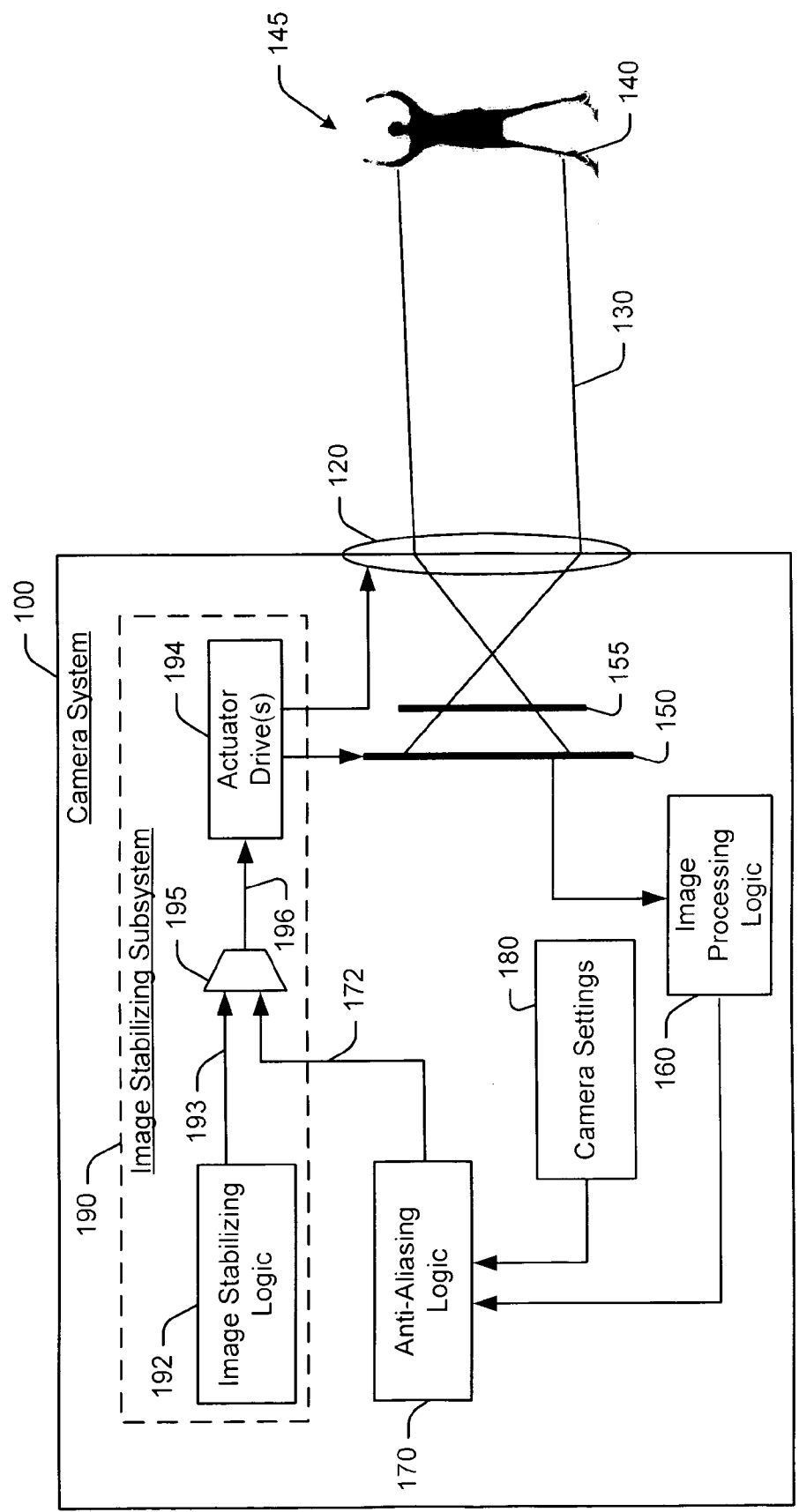
FIG. 1 is a high-level diagram of an exemplary camera system which may implement anti-aliasing with image stabilizing subsystems.

FIG. 1 is a high-level diagram of an exemplary camera system which may implement anti-aliasing with an image stabilizing Subsystem. Camera systems include digital still-photo and video cameras, now known or that may be later developed. Exemplary camera system 100 may be provided with logic for characterizing an image for aliasing, and then overlaying a dither signal for anti-aliasing on an image stabilizing signal such that the resulting control signal may be implemented to move or shift one or more optical elements during exposure for both image stabilizing operations and anti-aliasing.

Exemplary camera system 100 may include a lens 120 positioned in the camera system 100 to focus light 130 reflected from one or more objects 140 in a scene 145 onto an image sensor 150 when a shutter 155 is open (e.g., for image exposure). Exemplary lens 150 may be any suitable lens which focuses light 130 reflected from the scene 125 onto image sensor 150.

Exemplary image sensor 150 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 150 may include, but is not limited to, a charge-coupled device (CCD), or a complementary metal oxide semiconductor (CMOS) sensor.

Camera system 100 may also include image processing logic 160. In digital cameras, the image processing logic 160 receives electrical signals from the image sensor 150 representative of the light 130 captured by the image sensor 150 during exposure to generate a digital image of the scene 145.

Shutters, image sensors, and image processing logic, such as those illustrated in FIG. 1, are well-understood in the camera and photography arts. These components may be readily provided for camera system 100 by those having ordinary skill in the art after becoming familiar with the teachings herein, and therefore further description is not necessary.

Camera system 100 may also include anti-aliasing logic 170. Anti-aliasing logic 170 may be operatively associated with the image processing logic 160. During operation, anti-aliasing logic 170 receives one or more image (e.g., a pre-image) from the image processing logic, and characterizes the image for aliasing.

Using a pre-image enables the aliasing to be identified independent of any knowledge about the lens quality, zoom, and/or aperture settings. The pre-image(s) may be one or more of the pre-images already being implemented by the camera for focusing, auto-exposure, pre-flash calculations, and/or the pre-image(s) may be obtained specifically for the purpose of identifying aliasing. It is noted, however, that anti-aliasing is not limited to use with pre-images.

Techniques for characterizing an image for aliasing are well-understood. For example, an image with little or no high-frequency information may exhibit little (if any) aliasing. On the other hand, if the image includes many high frequency edges with high contrast, then the image may exhibit significant aliasing.

The image(s) may also be characterized for specific types of aliasing. For example, if there are near horizontal lines, there may be aliasing in the vertical direction, and blur may be introduced during exposure for anti-aliasing (e.g., by moving one or more optical element in the vertical direction). Likewise, if there are near vertical lines, there may be aliasing in the horizontal direction, and blur may be introduced during exposure for anti-aliasing (e.g., by moving one or more optical element in the horizontal direction). The image may also be analyzed for color aliasing. For example, if the image includes color artifacts, blur may be introduced during exposure for color anti-aliasing.

Other exemplary implementations of analyzing an image for anti-aliasing operations are known in the art. For example, co-owned U.S. patent application Ser. No. 10/637,956 filed on Aug. 8, 2003 of Matherson, et al. (Published on Feb. 10, 2005 as U.S. Patent Application Publication No. 2005/0030409) discloses methods and apparatus for generating data representative of an image and selecting a blur profile for anti-aliasing, and is hereby incorporated by reference for all that it discloses.

In addition to characterizing the image(s) for aliasing, other factors may also be considered for determining the amount of blur to introduce during exposure for anti-aliasing. For example, anti-aliasing logic 170 may also receive input from a camera settings module 180. Camera settings module 180 may include factory-configured and/or user-configured settings for the camera system 100. Exemplary factors may include, but are not limited to, user preferences (e.g., the desired image sharpness), camera mode (e.g., flash-on), operational mode (e.g., focal length), and/or the scene being photographed (e.g., light levels).

If the determination is made to introduce at least some blur during the image capture process for anti-aliasing, the anti-aliasing logic 170 may cooperate with an image stabilizing subsystem 190 to introduce blur (e.g., by moving one or more optical elements) during at least a portion of the exposure time. In exemplary embodiments, the image stabilizing subsystem 190 may already be provided for the camera to analyze camera motion or shaking and stabilize the image during exposure.

Image stabilizing subsystems for use with cameras are well-understood in the digital camera arts. For purposes of illustration, however, an exemplary image stabilizing subsystem 190 may include image stabilizing logic 192 and one or more actuator drive 194. The image stabilizing logic 192 determines how much and in what direction a camera is moving or shaking (e.g., based on input from a motion sensor such as a gyroscope), and generates one or more image stabilizing signals 193 for the actuator drive 194. In response, actuator drive 194 causes one or more optical element to move in a direction opposite the camera movement. By way of example, drive actuator 194 may move the lens 120, the image sensor 150, and/or other optical element(s) during at least part of the exposure.

In an exemplary embodiment, the anti-aliasing logic 170 generates one or more dither signals 172 indicating the desired amount of blur to be introduced by moving one or more optical element(s) during exposure for anti-aliasing. The dither signal(s) 172 may be combined with the image stabilizing signal(s) 193 (e.g., by multiplexer 195) to generate one or more control signals 196 for the actuator drive 194. Hence, the control signal(s) 196 indicates both how to move the optical element(s) for image stabilizing operations, and how to move the optical element(s) for anti-aliasing.

The control signal(s) 196 may identify the amount of movement and/or how the movement should be introduced. For example, the control signal(s) 196 may identify which optical element(s) should be moved or shifted, to what degree the optical element(s) should be moved or shifted, and/or start/stop/duration time for moving or shifting the optical element(s). It is noted that the image stabilizing signal(s) 193 and dither signal(s) 172 may identify different optical element(s) for moving, and/or result in moving those optical element(s) different degrees (e.g., in different directions, at different frequencies, and/or at different times) for the separate purposes of stabilizing and anti-aliasing the image.

It is also noted that amount and time of movement or shifting will depend at least to some extent on one or more design considerations, such as, e.g., which of the optical element(s) is being moved or shifted. For example, the amount of movement or shifting may be a fraction of a pixel or more for all or a portion of the exposure time, and is based on the amount of movement desired for stabilizing and anti-aliasing the image.

Before continuing, it is noted that the camera system 100 shown and described above with reference to FIG. 1 is merely exemplary of a camera system which may implement anti-aliasing with image stabilizing subsystems for cameras. The systems and methods described herein are not intended to be limited only to use with the camera system 100. Other embodiments of cameras which may implement anti-aliasing with image stabilizing subsystems for cameras are also contemplated.

Figure 2A:
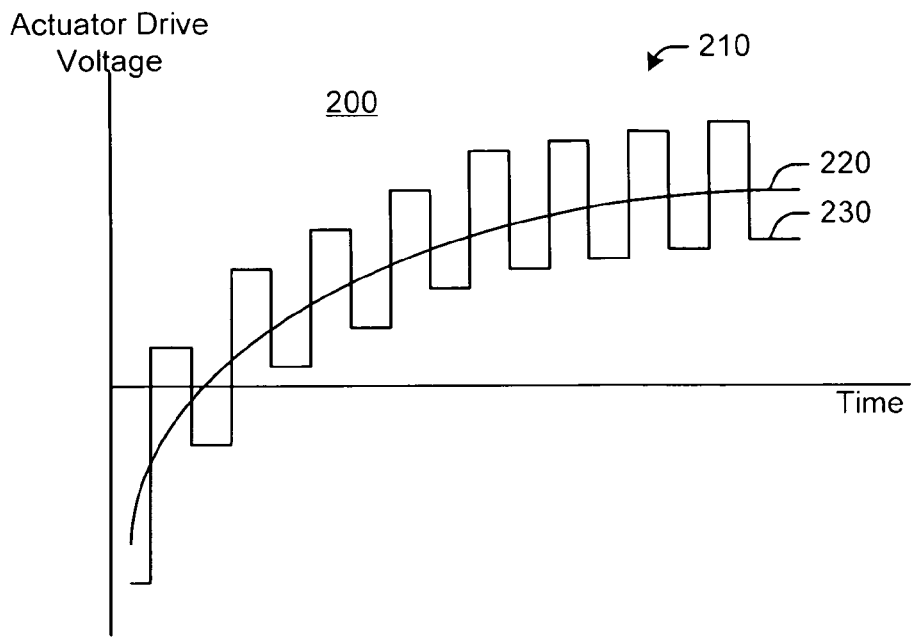
FIG. 2a is a plot illustrating an exemplary actuator drive voltage waveform with dither overlay.
Figure 2B:
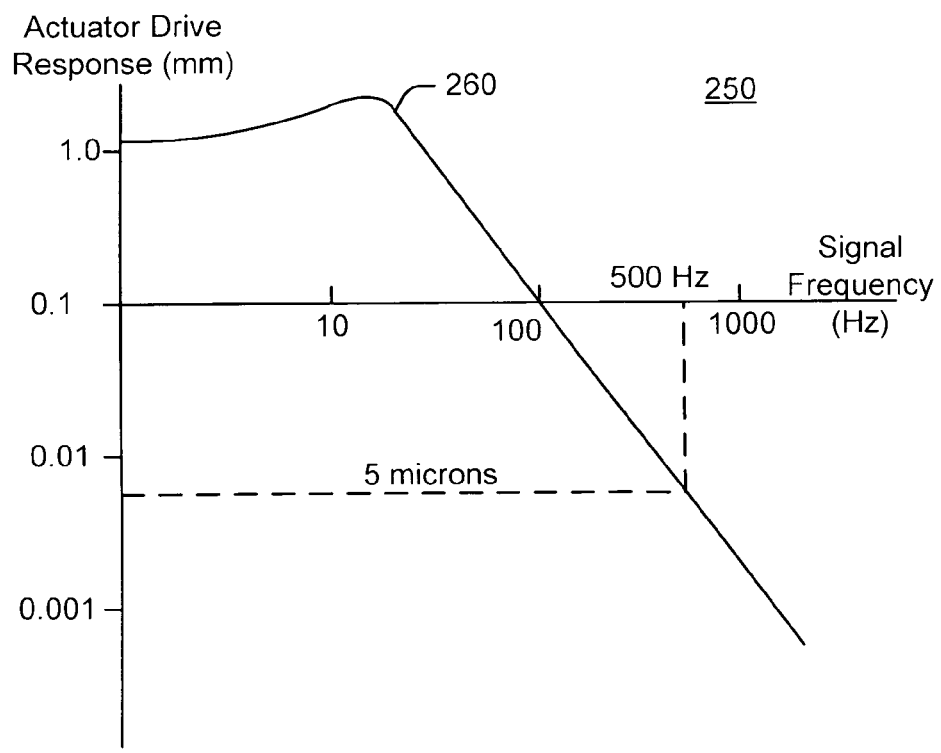
FIG. 2b is a plot illustrating a transfer function for an exemplary actuator drive.

FIG. 2*a* is a plot 200 illustrating a waveform 210 for an exemplary control signal. The waveform for the exemplary control signal may comprise a low frequency waveform 220 (i.e., the image stabilizing signal) and a high frequency square wave 230 (i.e., the dither signal). Even though a high frequency dither signal 230 may be implemented, the resulting movement of the optical element(s) is relatively small due to the relatively large mass of the optical element(s). FIG. 2*b* is a plot 250 illustrating a transfer function 260 for an exemplary actuator drive. It is observed that a 1 volt, 500 Hz dither signal results in movement of about 5 μm.

The frequency and amplitude of the image stabilizing signal 220 and dither signal 230 (FIG. 2*a*) may be selected such that the resulting motion of the optical element(s) corresponds to the desired motion, e.g., direction, type, and timing for stabilizing and anti-aliasing the image. In digital control systems, the signal frequency is constrained by the sample frequency. For example, a 1 kHz sample rate may be implemented to generate a maximum frequency of 500 Hz for the dither signal. The amplitude of the signals may be derived from the frequency response characteristic of the actuator drive.

Figure 3:
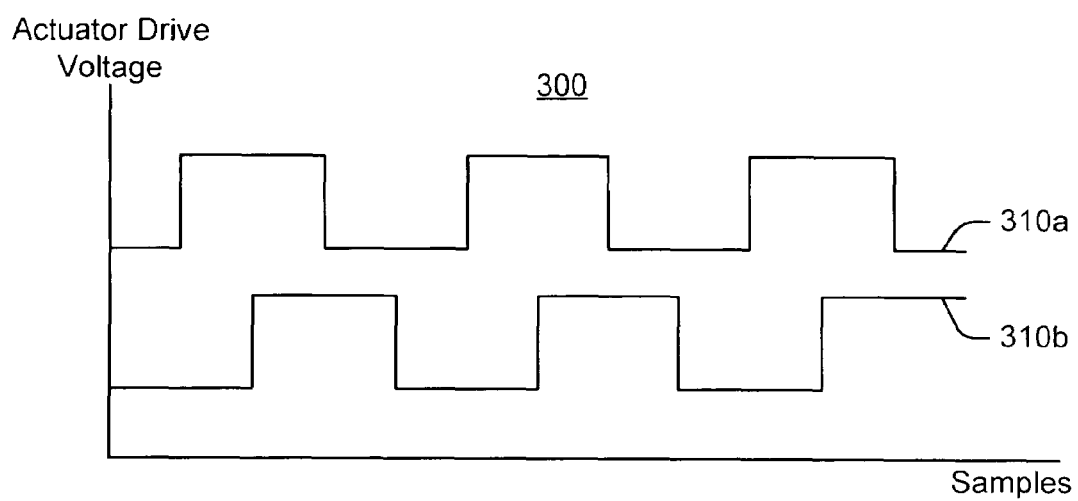
FIG. 3 is a plot illustrating exemplary quadrature dither signals, and another plot illustrating the resulting motion response.
Figure 3:
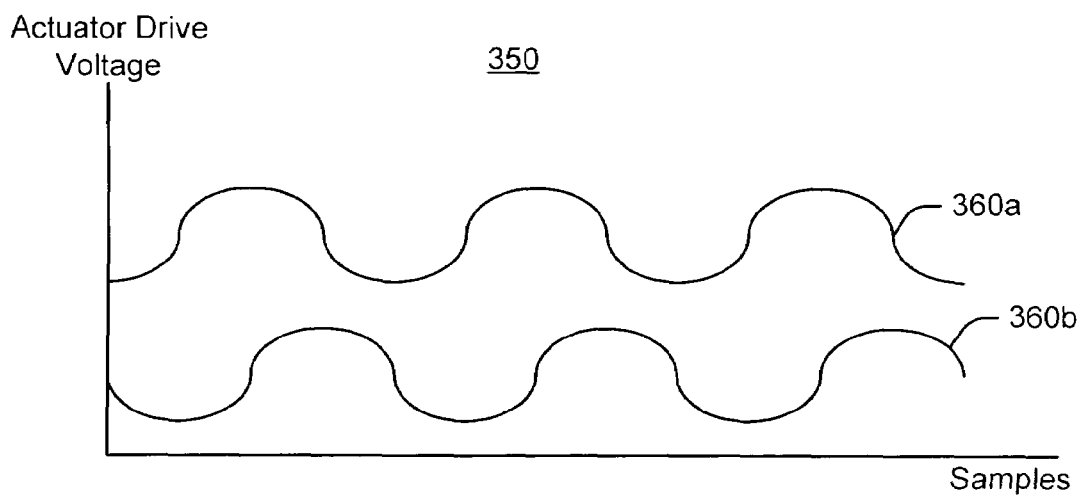

FIG. 3 is a plot 300 illustrating exemplary quadrature dither signals 310*a-b*, and another plot 350 illustrating the resulting motion response 360*a-b*. In an exemplary embodiment, the dither overlay signals may comprise a signal for controlling side-to-side movement or yaw (waveform 310*a*) and another signal for controlling up-and-down movement or pitch (waveform 310*b*). It is observed from the corresponding waveforms 360*a* and 360*b* in plot 350, respectively, that the motion is approximately sinusoidal, despite the square wave excitation observed in plot 300, and is due to the characteristics of the actuator response.

FIG. 4 is a plot 400 illustrating exemplary actuator response 410 to a dither overlay signal. It is observed from the plot 400 that applying substantially identical dither signals to the pitch and yaw axes, as discussed above with reference to FIG. 3, results in diagonal motion (e.g., illustrated by arrows 420*a-d*). Accordingly, the dither signal may be applied in quadrature to the two axes to achieve substantially circular motion, as observed in FIG. 4. Alternatively, the same sample rate may be used if the pitch and yaw signals are offset, such as by a processing delay.

It is noted that in the above example, the dither signal may complete one cycle every $\frac{1}{500}$ second (see, e.g., FIG. 2*b*). This frequency works well for longer exposure times (e.g., $\frac{1}{200}$ second), because the dither signal may result in several cycles of motion. However, if the camera system has a faster shutter speed, and therefore a shorter exposure time (e.g., $\frac{1}{1000}$ or $\frac{1}{2000}$ second), then the control signal may be reverted from quadrature-mode (circular motion) to diagonal-mode. For example, the dither voltage may be calibrated to generate the appropriate slew rate to cover a pixel pitch in both X and Y directions even for short exposure times. Alternatively, other dither waveforms, frequencies, or patterns may be implemented. Performance may also be enhanced by tuning the demosaic algorithm implemented by the image processing logic.

Before continuing, it is noted that plots described above with reference to FIGS. 2*a-b*, 3, and 4 are provided only for purposes of illustration and are not intended to be limiting. In addition, the examples discussed above are based on analyzing an image for aliasing in real-time, but it is noted that adaptive analysis models may also be implemented for anti-aliasing based at least in part on other input (e.g., camera settings and/or user selections).

Exemplary Operations

FIG. 5 is a flowchart illustrating exemplary operations which may implement anti-aliasing with image stabilizing subsystems for cameras. Operations 500 may be embodied as logic instructions on one or more computer-readable medium in the camera. When executed on a processor at the camera, the logic instructions implement the described operations. In an exemplary embodiment, the components and connections depicted in the figures may be used for anti-aliasing with image stabilizing subsystems for cameras.

The process starts in operation 510. For example, the process may start every time a user depresses the shutter button to the S1 position to obtain an image on the LCD prior to taking a picture of an image. Alternatively, the process may start after the image has been brought into focus. In still another example, the process may start only if one or more predetermined criteria have been satisfied (e.g., the anti-aliasing mode is selected by the user).

It is noted that the anti-aliasing process may also be deactivated automatically or manually by the user so that the process does not start in operation 510. For example, it may be desirable to deactivate anti-aliasing if the user is photographing a moving subject, or panning a scene. In an exemplary embodiment, the process may be automatically deactivated, e.g., based on motion detected during pre-exposure.

In operation 520, an image is characterized for aliasing. For example, a pre-image may be used (e.g., for focusing the camera on the scene). Different degrees of aliasing, including little or no aliasing, may exist in the image. For example, aliasing may be due to the focal length of the camera, ambient light levels in the scene being photographed, etc. In addition, one or more type of aliasing may be introduced, such as, e.g., jagged lines and/or color artifacts.

In operation 530, a determination may be made to repeat operation 520. For example, additional images may be obtained in operation 520 and used to characterize the aliasing over time (e.g., using statistical models). If a determination is made not to repeat, or to stop repeating, operations may proceed.

In operation 540, the amount of blur to introduce during exposure is determined to achieve the desired anti-aliasing. The amount of blur needed may be based on the degree of aliasing in the image (e.g., as determined in operation 520), and/or other factors (e.g., camera settings).

In operation 550, a dither signal corresponding to the desired anti-aliasing may be overlaid on an image stabilizing signal, e.g., to generate a control signal for moving one or more optical elements during exposure. It is noted that the camera may be experiencing little or no motion (e.g., if it is being used on a tripod), and therefore, an image stabilizing signal may not be issued (or a null image stabilizing signal may be issued). In such instances, the control signal may include only the dither signal (or the dither signal overlaid on a null image stabilizing signal).

In operation 560, the image is captured while moving or shifting one or more optical elements in the camera. For example, the control signal may identify which optical element(s) to move or shift, to what extent to move or shift the optical element(s), and/or timing information. The control signal may be input to a drive actuator to move or shift one or more optical elements in the camera during exposure.

The operations shown and described herein are provided to illustrate exemplary embodiments of anti-aliasing with image stabilizing subsystems for cameras. It is noted that the operations are not limited to the ordering shown. For example, the determination whether to repeat operation 520 may be deferred until after operation 540 if the previously captured images were not sufficiently characterized. In addition, operations may terminate and/or restart at any point in time, e.g., if the user focuses the camera on a different scene, or if the characterization in operation 520 has otherwise become invalid.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A system comprising:
   anti-aliasing logic generating a dither signal for anti-aliasing an image;
   an image stabilizing subsystem generating an image stabilizing signal for stabilizing the image; and
   at least one actuator drive operatively associated with at least one optical element in a camera, the at least one actuator drive moving the at least one optical element during exposure of the image according to a control signal based on a combination of the dither signal and the image stabilizing signal, and
   wherein the control signal based on a combination of the dither signal and the image stabilizing signal is applied variably for short exposure times and for long exposure times.

2. The system of claim 1 wherein the dither signal is a high-frequency signal.

3. The system of claim 1 wherein the image stabilizing signal is a low-frequency signal.

4. The system of claim 1 wherein the image stabilizing signal is a null signal.

5. The system of claim 1 wherein the image stabilizing signal is combined with the dither signal and input to the at least one actuator drive as a control signal.

6. The system of claim 1 wherein the anti-aliasing logic characterizes a pre-image, the anti-aliasing logic generating the dither signal based at least in part on aliasing in the pre-image.

7. The system of claim 6 wherein the anti-aliasing logic generates the dither signal based in part on at least one of the following: camera settings, user-preferences, and a scene being photographed.

8. The system of claim 1 wherein the actuator drive moves the at least one optical element in the camera during at least part of the exposure of the image.

9. The system of claim 8 wherein the actuator drive moves the at least one optical element a predetermined amount of time in at least one direction during exposure of the image.

10. A method comprising:
    characterizing motion of a camera;
    generating an image stabilizing signal based on motion of the camera;
    characterizing aliasing for an image being photographed by the camera;
    generating a dither signal based on aliasing for the image;
    overlaying the dither signal and the image stabilizing signal to generate a control signal; and
    moving at least one optical element in the camera during exposure of the image based on the control signal for both stabilizing and anti-aliasing the image, and
    wherein the control signal is applied in diagonal-mode and follows camera motion based on exposure time.

11. The method of claim 10 wherein the at least one optical element responds to high-frequency input for anti-aliasing the image.

12. The method of claim 10 wherein the at least one optical element responds to low-frequency input for stabilizing the image.

13. The method of claim 10 further comprising multiplexing an image stabilizing signal and a dither signal for moving the at least one optical element in the camera during exposure of the image.

14. The method of claim 10 further comprising analyzing a pre-image for characterizing motion and aliasing.

15. The method of claim 10 wherein moving the at least one optical element is based in part on at least one of the following: camera settings, user-preferences, and a scene being photographed.

16. The method of claim 10 wherein moving the at least one optical element in the camera is during only a part of the exposure of the image.

17. The method of claim 10 wherein moving the at least one optical element in the camera is for a predetermined amount of time and in at least one direction during the exposure of the image.

18. A camera system comprising:
    image stabilizing means for characterizing motion of a camera;
    anti-aliasing means for characterizing aliasing for an image being photographed by the camera; and
    optical control means for moving at least one optical element in the camera during exposure of the image based on combined output from the image stabilizing means and anti-aliasing means, wherein the control signal based on a combination of the dither signal and the image stabilizing signal is applied variably for short exposure times and for long exposure times.

19. The camera system of claim 18 further comprising means for combining output from the image stabilizing means with output from the anti-aliasing means.

20. The camera system of claim 18 further comprising means for capturing at least one pre-image, wherein the image stabilizing means and the anti-aliasing means separately characterize the at least one pre-image.

* * * * *